United States Patent [19]
Stehling et al.

[11] Patent Number: 5,596,893
[45] Date of Patent: Jan. 28, 1997

[54] DEVICES FOR SECURING FIRE HYDRANT VALVES

[75] Inventors: Henry J. Stehling, Bedford; Roy Istre, Jr., Spring; Sheldon Levine, Houston; Horace E. Nichols, Jr., Humble, all of Tex.

[73] Assignee: Hydra-Shield Manufacturing, Inc., Irving, Tex.

[21] Appl. No.: 579,767

[22] Filed: Dec. 28, 1995

[51] Int. Cl.⁶ .................................................. F16K 35/16
[52] U.S. Cl. ............................ 70/175; 70/176; 70/189; 70/276; 137/296; 251/65; 251/267
[58] Field of Search .......................... 70/188, 189, 222, 70/223, 175–180, 276, 229–232; 137/296; 251/65, 267

[56] References Cited

U.S. PATENT DOCUMENTS

| | | | |
|---|---|---|---|
| 3,840,041 | 10/1974 | McMurray | 137/296 |
| 3,916,939 | 11/1975 | Gillard | 137/296 |
| 4,390,038 | 6/1983 | Salvato | 137/296 |
| 4,620,428 | 11/1986 | Kopesky | 70/175 |
| 4,716,922 | 1/1988 | Camp | 70/276 X |
| 5,072,750 | 12/1991 | Poms et al. | 70/175 X |
| 5,205,312 | 4/1993 | Jerman et al. | 70/175 X |

*Primary Examiner*—Lloyd A. Gall
*Attorney, Agent, or Firm*—Millen, White, Zelano, & Branigan, P.C.

[57] ABSTRACT

A magnetic security device for preventing unauthorized opening of fire hydrant valves includes an inner cylindrical member which is fixed to a nut on the valve stem and an outer rotatable member which is coupled to the inner cylindrical member by a magnetizable element. The magnetizable element is attracted to move from an uncoupled to a coupling mode by a reaching permanent magnet integral with a special operating wrench. In accordance with one embodiment of the invention, an intermediate sleeve is provided which is coaxial with a nylon sleeve disposed around the outer surface of the inner cylindrical member. In addition, the inner cylindrical member has a knurled portion which engages the surface of a recess surrounding the valve operating nut so that if the outer operating member is tilted with respect to the inner operating member, the inner operating member binds with the wall of the recess, preventing rotation of the inner operating member and of the valve operating nut attached thereto. In accordance with a further arrangement, an intermediate sleeve of hardened steel and a plate of hardened steel surround otherwise accessible portions of the inner cylindrical member to prevent drill bits, which have penetrated the outer rotatable member, from penetrating the inner cylindrical member so that a pin cannot be inserted into the inner cylindrical member to link the members together allowing an unauthorized person can open the valve by rotating the outer rotatable member.

8 Claims, 7 Drawing Sheets

DEVICES FOR SECURING FIRE HYDRANT VALVES

FIELD OF THE INVENTION

The present invention relates to devices for securing fire hydrant valves. More particularly, the present invention relates to magnetically operated devices for securing fire hydrant valves.

BACKGROUND OF THE INVENTION

Municipal and county water departments are frequently confronted with unauthorized use of fire hydrants by members of the public who, on occasion, open the valves of the hydrants to obtain water to cool-off on hot days or for the purpose of filling tank trucks with fresh water which is then sold for various purposes, such as filling swimming pools. In cities, open fire hydrants can result in a drop in water pressure to customers and can occasionally endanger a community by reducing the availability of water necessary to fight fires.

In attempts to secure fire hydrants from unauthorized use, fire companies have employed locking devices such as the magnetic valve lock of U.S. Pat. No. 4,620,428. The particular valve lock disclosed in the '428 patent utilizes a magnetic detent which couples the valve operating nut of the fire hydrant to a sleeve which is normally freely rotatable with respect to the nut. The magnet is attracted by a second magnet permanently mounted in a wrench which cooperates with the sleeve to rotate the sleeve. With the help of magnets, sledge hammers and other nefarious devices, water thieves and vandals are increasingly able to defeat magnetic locking devices such as that shown in the '428 patent. Accordingly, there is a need for improvement in magnetic locks for fire hydrant operating valves which minimize the effectiveness of various techniques employed by unauthorized users to operate the valves.

SUMMARY OF THE INVENTION

Upon further study of the specification and appended claims, further features and advantages of this invention will become apparent to those skilled in the art.

In view of the aforementioned concerns, it is a feature of the present invention to provide a new and improved magnetic device for securing fire hydrant operating valves which render the operating valves difficult to open by unauthorized users while remaining easy to open by firemen.

In view of this feature, and other features, the present invention is directed to a device for use with a fire hydrant having a valve stem connected to a valve, wherein rotation of the valve stem opens and closes the valve. In accordance with the invention, an inner cylindrical member having a lower end with a recess opening downwardly receives the valve stem in a non-rotational relationship. The inner cylindrical member has an upper end with a first coupling element. An outer rotational member is concentrically mounted over the inner cylindrical member for normal rotation with respect to the inner cylindrical member. The outer rotational member has a second coupling member. A moveable magnetic element is mounted between the inner cylindrical member and outer rotational member and is urged to a first position normally decoupling the first and second coupling elements but is moveable to a second position coupling the first and second elements in a non-rotational relationship. When the magnetic element is in the second position, rotation of the outer rotational member can rotate the inner cylindrical member to rotate the valve stem and open the valve. The moveable magnetic element has a very weak magnetic field requiring an intense magnetic field for movement from the first position to the second position.

In a further aspect of the invention, a wrench which is mechanically interlockable with the outer rotational member, includes a permanent magnet with an extremely strong magnetic field that is integral with the wrench and alignable with the magnetic element for moving the magnetic element from the first to the second position when the wrench is interlocked with the outer rotational member.

In still a further aspect of the present invention, an annular sleeve is disposed between the inner cylindrical member and outer rotational member, the sleeve in one embodiment being a hardened steel sleeve and in another embodiment, being a nylon sleeve.

In still a further aspect, the inner-cylindrical member includes a knurled portion which engages the cylindrical wall of a portion of the hydrant, preventing the inner-cylindrical member from rotating with respect to the hydrant body in the case that the outer rotatable member has become sufficiently distorted to bind or weld with the inner-cylindrical member.

In still a further aspect of the present invention, the inner-cylindrical member is armored with a hardened steel plate disposed around the periphery of the magnetic element, which plate cooperates with the previously mentioned hardened steel sleeve to shield the inner cylindrical member from drilling.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar pans throughout the several views, and wherein.

DETAILED DESCRIPTION OF THE DRAWINGS

Figure 1:
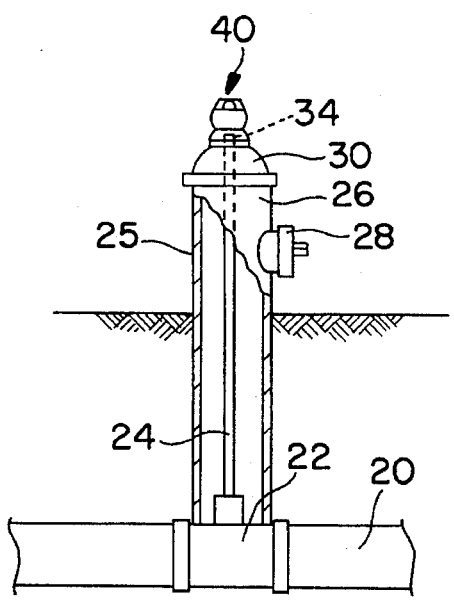
FIG. 1 is a side view, partially in section, showing a fire hydrant with a magnetic valve securing device configured in accordance with the principles of the present invention.

Referring now to FIG. 1, there is shown a water line 20 having a valve 22 thereon which is opened by an elongated valve stem 24 to admit water into the body 25 of a fire hydrant 26. Upon opening a protective cap 28, water in the body 25 of the fire hydrant is available for use by a fire department. The fire hydrant 26 has a domed top 30 that has a circular recess 34 in which is positioned a pentagonal operating nut 36 that is fixed to the elongated valve stem 24. Disposed on the domed top 30 is a magnetic valve security device 40, configured in accordance with the principles of the present invention.

Referring now to FIGS. 2–7 wherein the first embodiment of the invention, the magnetic valve securing device 40, is shown in detail, it is seen that the device is comprised of an inner cylindrical member 42 which has a recess 44 in the shape of a pentagon which receives the pentagonal operating nut 36 which is fixed to or unitary with the valve stem 24. The operating nut 36 has a threaded bore 46 therein which receives the threaded shank 48 of a bolt 50 to hold the inner cylindrical member 42 in assemblage with the pentagonal nut 36. When the inner cylindrical member 42 rotates, then the valve stem 24 is rotated to either open or close valve 22 and let water from the water line 20 into the body 25 of the hydrant 26 (see FIG. 1). The inner cylindrical member 42 has a square recess 52 in the top thereof aligned with a bolt 50. The square recess 52 also contains a magnetizable element 54 which is also square in cross section and compliments the recess 52.

The magnetizable element 54 is preferably made of 440C stainless steel which is both magnetizable and rust resistant. The magnetizable element 54 is slidable in the direction of axis 56, but is not rotatable in the square recess 52.

Aligned with the square recess 52 and the square magnetizable element 54 is a second square recess 58 positioned in an outer rotatable member 60 which forms a cap for the assembly 40. The outer rotatable member 60 is fixed for relative rotation on the inner cylindrical member 42 by a split nylon washer 62 received in an inwardly facing groove 64 in the outer rotatable member, which split washer is interlocked with the inner cylindrical member, as will be further explained hereinafter. The outer rotatable member 60 is case 8620 steel which is hardened to about RC 30.

Figure 2:
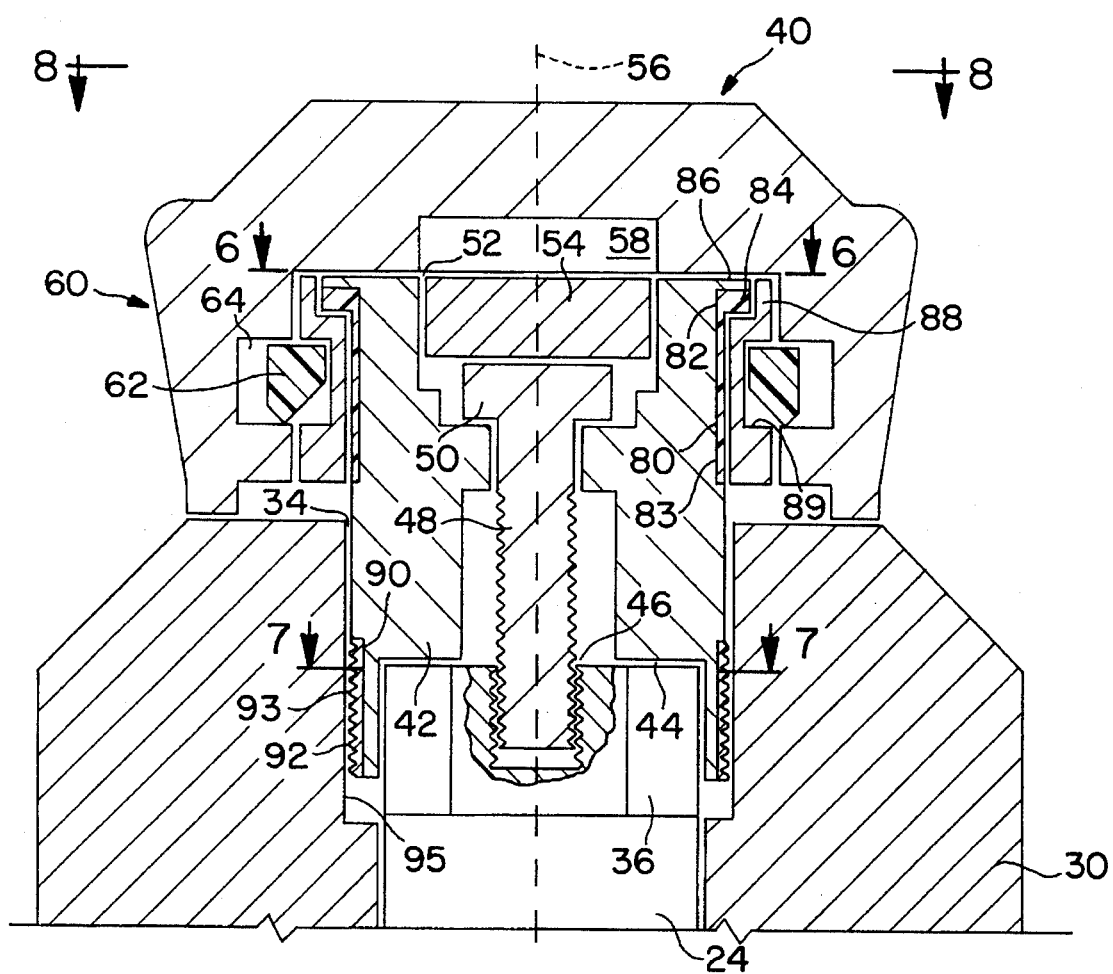
FIG. 2 is a side elevation of a first embodiment of a valve securing device configured in accordance with the principles of the present invention in an uncoupled mode.

Normally, the magnetizable element 54 rests within the recess 52 and is not within the recess 58. If the outer rotatable member 60 is then rotated about the axis 56, it will spin freely with respect to the inner cylindrical member 42, valve nut 36 and valve stem 24. Thus, the inner cylindrical member 42 cannot be operated by the outer rotatable member 60. In FIG. 2, the valve securing device 40 is shown in an uncoupled mode so that unauthorized users cannot open the valve 22 (FIG. 1).

Figure 3:
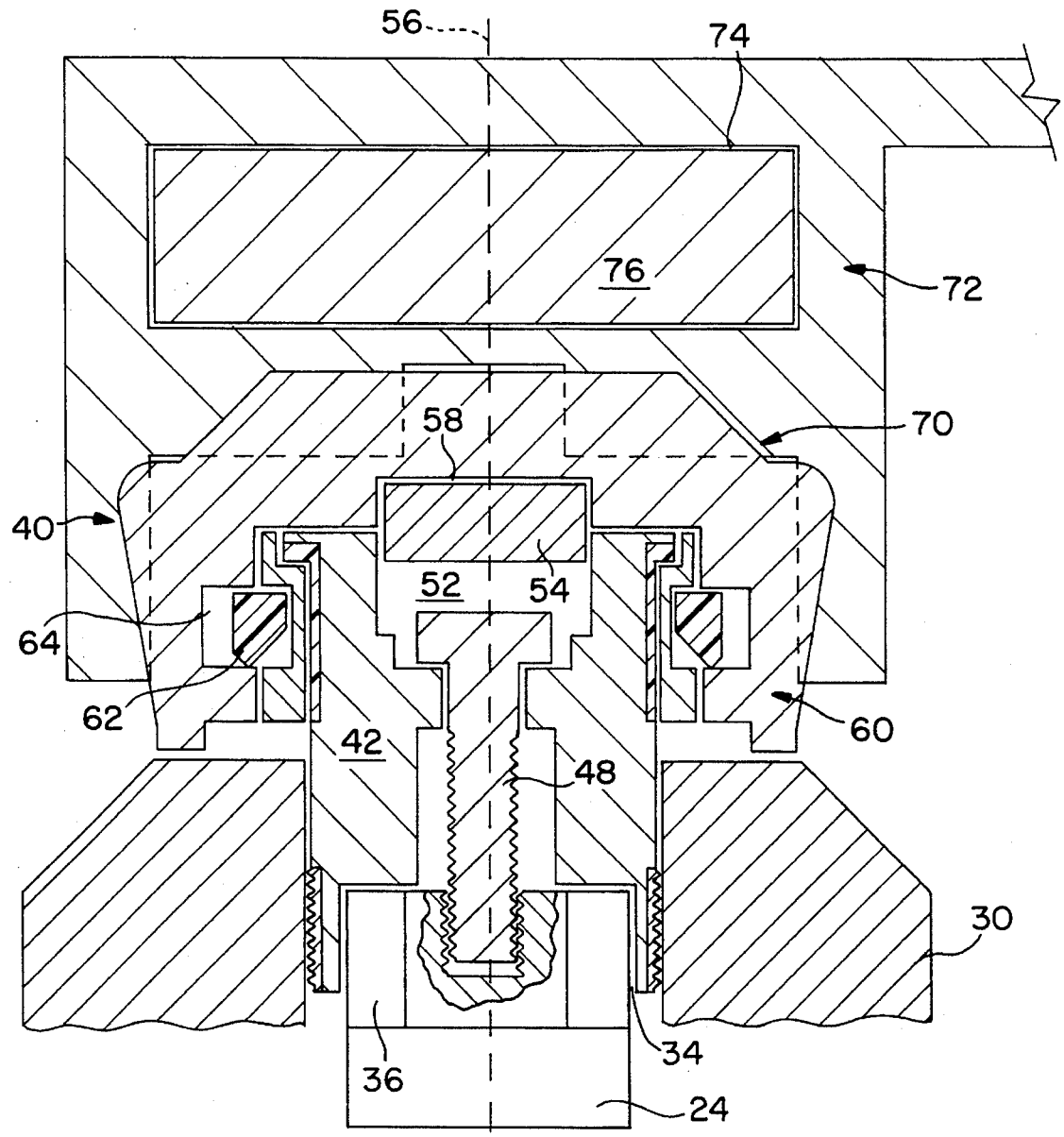
FIG. 3 is a view similar to FIG. 2 but showing the valve securing device in a coupled mode for operation by a wrench.
Figure 4:
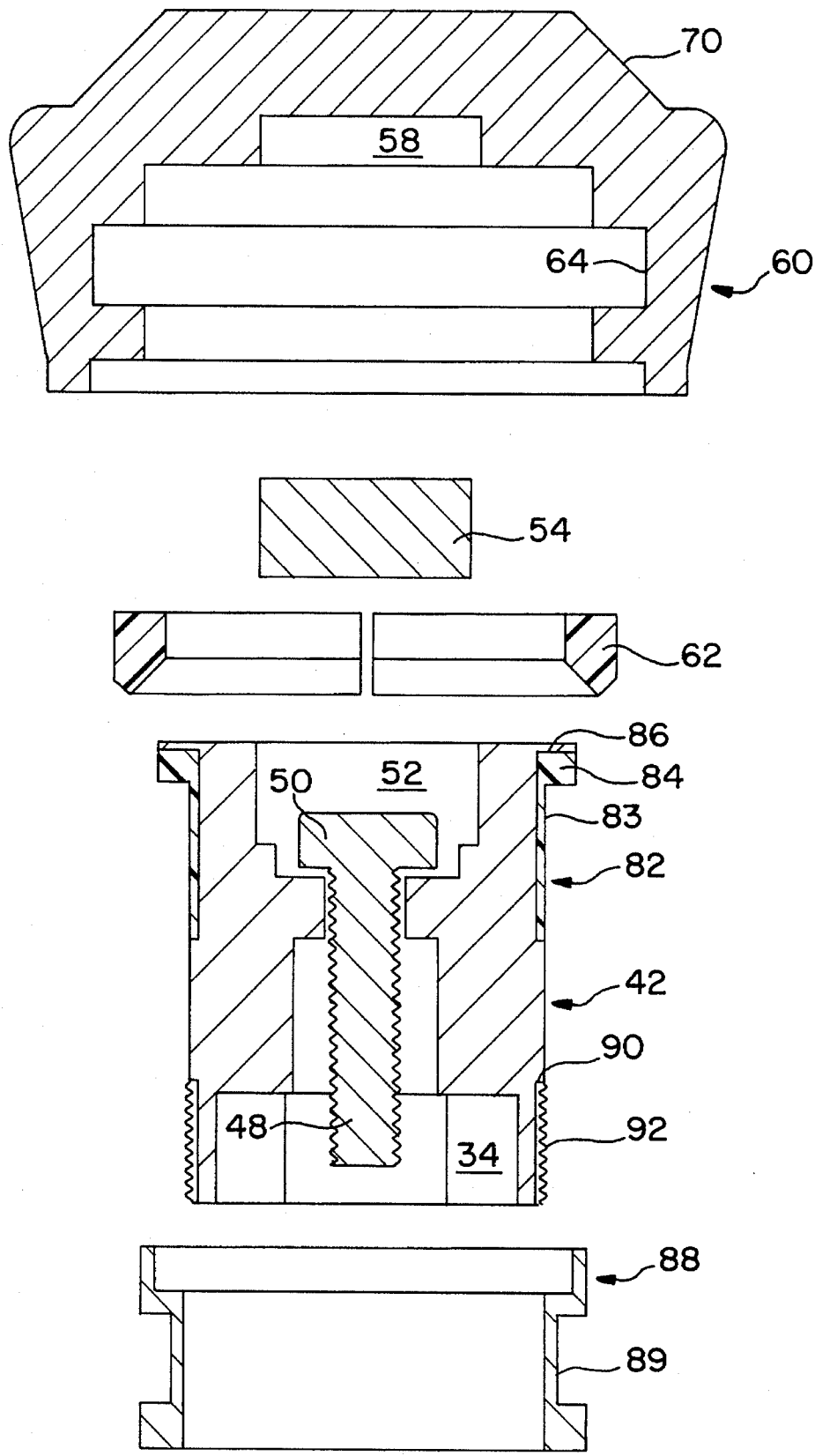
FIG. 4 is an exploded view of the magnetic valve securing device of FIGS. 2 and 3.
Figure 7:
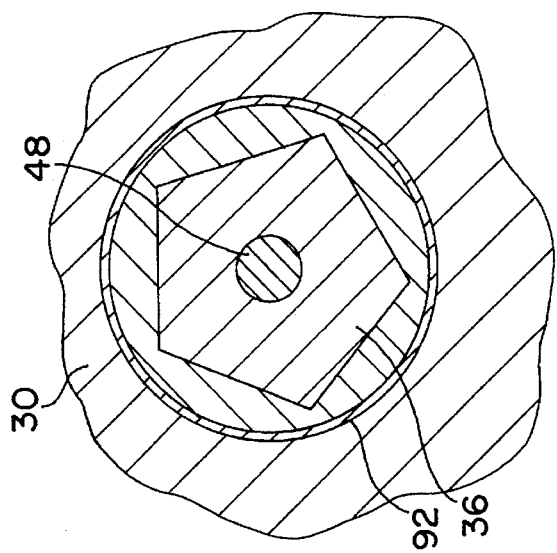
FIG. 7 is a top elevational view taken along lines 7—7 of FIG. 2.
Figure 6:
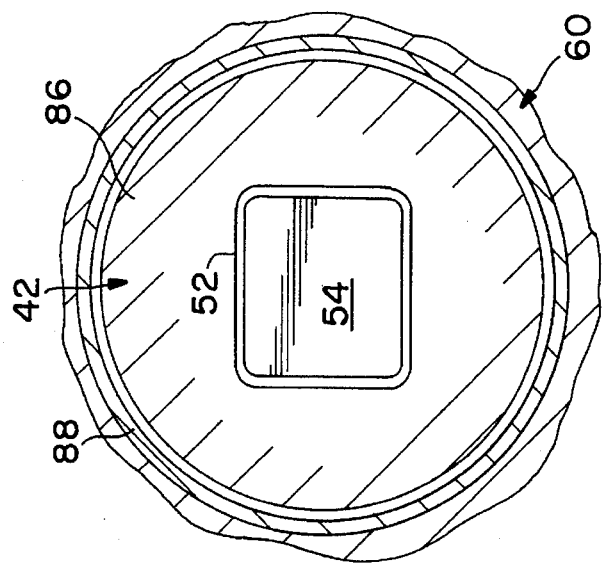
FIG. 6 is a top elevational view taken along lines 6—6 of FIG. 2.

Referring now to FIG. 3, it is seen that the magnetizable element 54 has been drawn into the second rectangular recess 58 in the outer rotatable member 60. The depth of the square recess 58 is such that it does not receive the entire thickness of the magnetizable element 54 so that a portion of the magnetizable element remains in the square recess 52. Since the recesses 52 and 58 are square and the magnetizable element 54 is square, the inner cylindrical member 42 must then rotate when the outer rotatable member 60 rotates.

Figure 5:
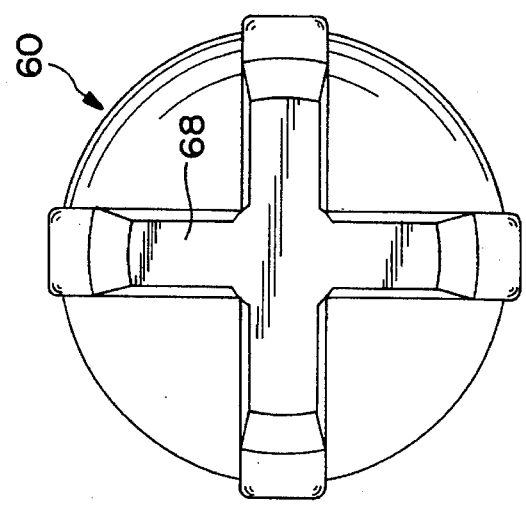
FIG. 5 is a top view of the valve securing device of FIGS. 2–4.

As is best seen in FIG. 5, the outer rotatable member 60 has a cruciform rib arrangement or portion 68 on the exterior thereof, which rib arrangement or portion is received in a complementary socket 70 of a wrench 72. Accordingly, when the wrench 72 is rotated about axis 56, the outer rotatable member 60 rotates with the wrench. The wrench 72 includes a pocket 74 therein which includes a reaching permanent magnet 76. The very strong permanent magnet 76 magnetizes the magnetizable element 54 and pulls the element upwardly into the recess 58 in the outer rotatable member 60 so that the outer rotatable member 60 is locked with respect to the inner cylindrical member 42, thereby driving the valve stem 24 to rotate when the wrench 72 turns the outer rotatable member 60 about axis 56.

The present invention includes a number of features that enhance the effectiveness of the operating valve security device 40. The first feature is to make the magnetizable element 54 of a material which requires a strong reaching magnet for induction such as the reaching magnet 76. The reaching magnet 76 is expensive and difficult to obtain. Consequently, an unauthorized person utilizing ordinary magnets obtainable through a retail outlet is unable to move magnetizable element 54 from its FIG. 2 to its FIG. 3 position.

In order to make it more difficult for an unauthorized user to defeat the fire hydrant security device 40, the inner cylindrical member has an annular indentation 80 therein which receives a nylon sleeve 82. The nylon sleeve 82 has a generally cylindrical portion 83 and a lip 84 which abuts a peripheral flange 86 on the inner cylindrical member 42. Surrounding the nylon sleeve 82 is an intermediate sleeve 88 which has a groove 89 therein in which the split nylon ring 62 seats. Since the split nylon washer 62 seats also in the groove 64 of the outer rotatable member 60 it is not slidably removable in the direction of axis 56. The intermediate sleeve 88 rotates freely with respect to the nylon sleeve 82 as dose the outer rotatable member 60 unless the magnetic element 54 is moved from the FIG. 2 to the FIG. 3 position locking the inner, cylindrical member 42 and outer rotatable member to one another. Nylon sleeve 82 provides a barrier which prevents the intermediate member 88 from becoming welded to the inner cylindrical member 42 so that when a vandal strikes the device 40 with a sledge hammer, welding does not occur between the outer rotatable member 60, intermediate member 88 and inner cylindrical member 42 and the outer rotatable member remains freely rotatable with respect to the inner cylindrical member.

At its lower end, the inner cylindrical member 42 has a second annular indentation 90 which receives a knurled sleeve 92. The knurled sleeve 92 has an outer surface 93 which is roughened with very small projections or teeth which are positioned adjacent smooth annular wall 95 of the cap 30. If an unauthorized person attempts to bind the outer rotatable member 60 to the inner cylindrical member 42 by applying torque tending to tilt the outer rotatable member 60 slightly with respect to the axis 56, the teeth 93 of the knurled surface 92 bite into the surface of the wall 95, preventing the outer rotatable member 60 from rotating at all. Consequently, even if purchase is gained against the inner cylindrical member 42 by tilting the outer rotatable member 60, the valve stem 24 cannot be rotated because the outer rotatable member cannot be rotated. The knurled sleeve 92 and the nylon sleeve 82 provide security supplemental to the magnetizable element 54, further enhancing the effectiveness of the security device 40.

Figure 8:
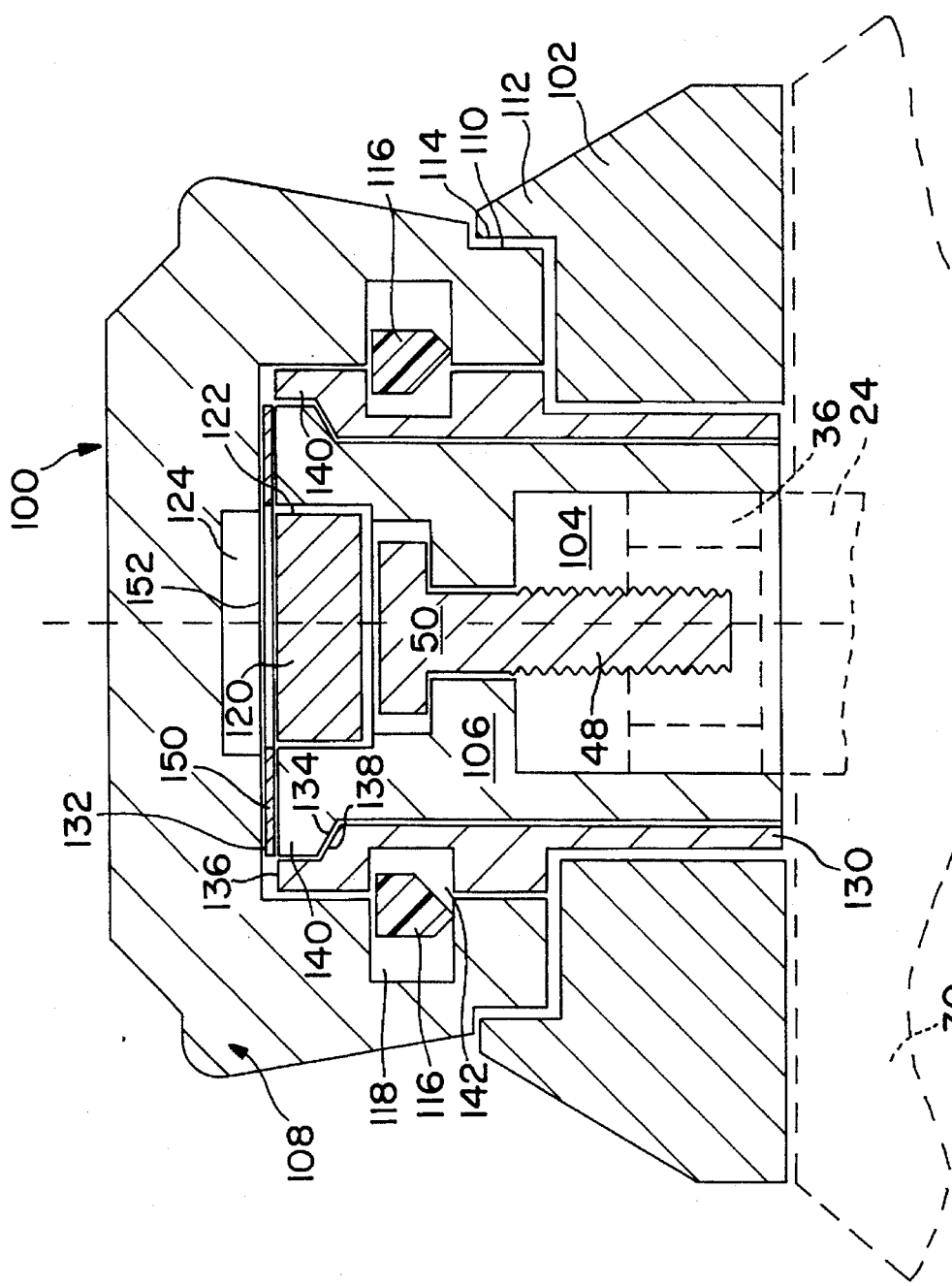
FIG. 8 is a side elevational view of a second embodiment of a magnetic valve securing device configured in accordance with the principles of the present invention, showing the showing device in an uncoupled mode.
Figure 9:
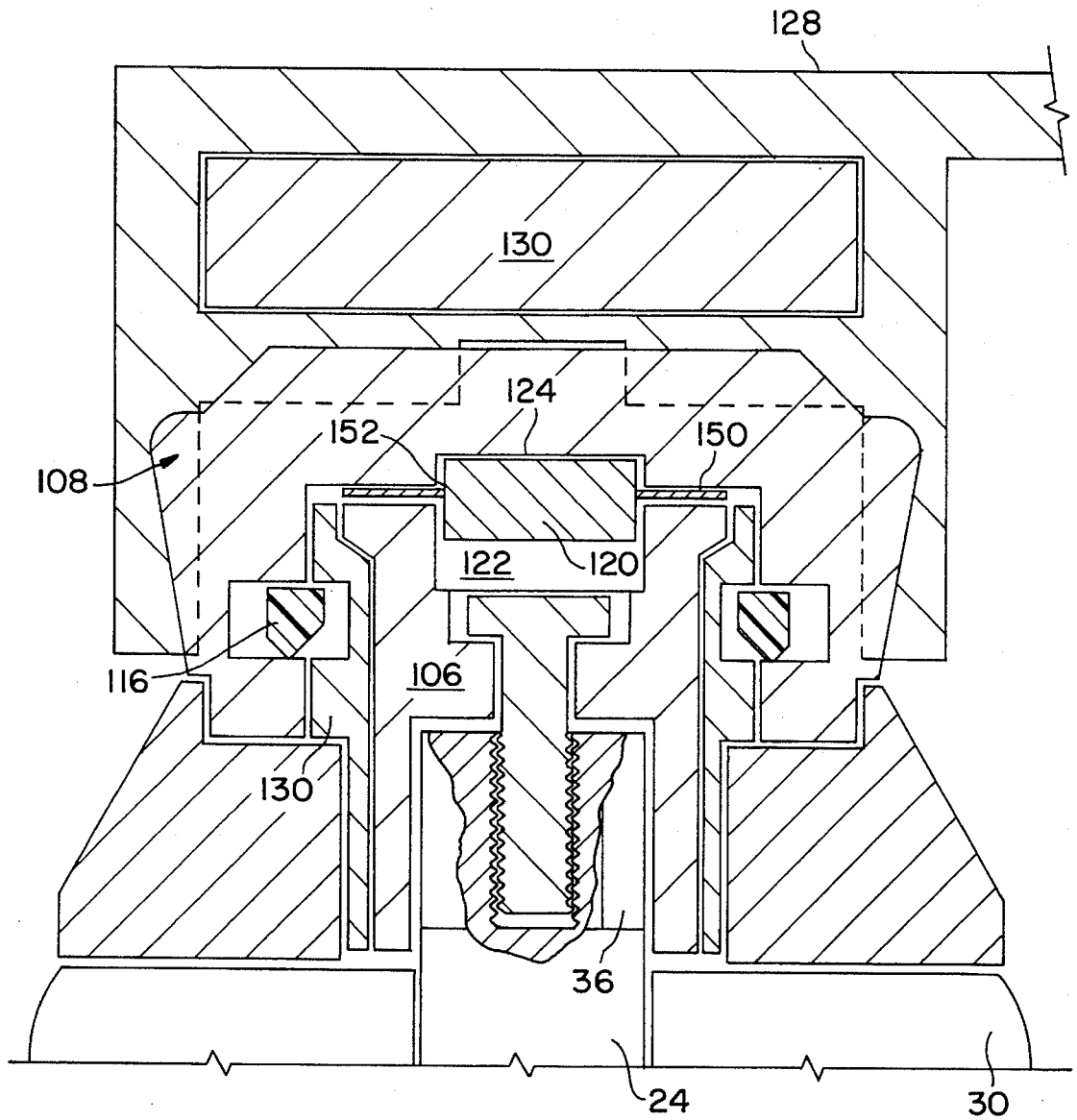
FIG. 9 is a view similar to FIG. 8, but showing the securing device in a coupled mode.
Figure 10:
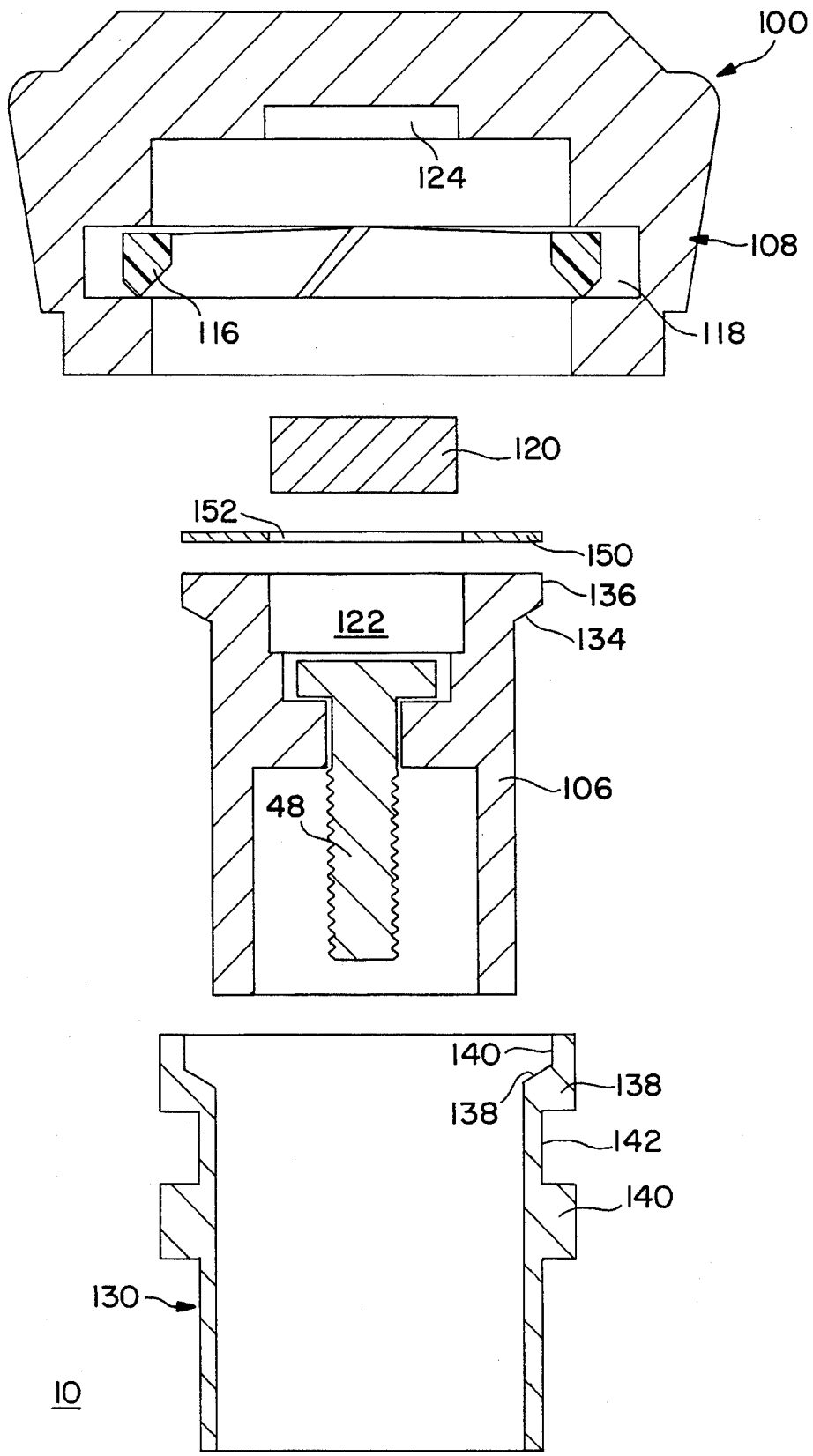
FIG. 10 is an exploded view of the second embodiment of the valve security device of FIGS. 8 and 9.

Referring now to FIGS. 8, 9 and 10, there is shown a second embodiment of the valve securing device, this time designated generally by the numeral 100. The valve securing device 100 is mounted on a fire hydrant, such as the fire hydrant 25 of FIG. 1 to secure a valve 22. Unlike the first embodiment 40, the second embodiment includes a thick rotatable collar 102 which is freely rotatable with respect to the cap 30 of the fire hydrant. As with the embodiment of FIG. 1, the valve securing device 100 of FIGS. 8–10 utilizes a bolt 50 with a threaded shank 48 for securing the device to a hex nut 36 unitary with a valve stem 24. Generally, the type of fire hydrant with which the security device 100 is utilized has a projecting pentagonal nut 36 which is received within a pentagonal opening 104 in an inner cylindrical member 106. The thick rotatable collar 102 is positioned coaxially with respect to the nut 36 to block lateral access to the area occupied by the nut.

As with the first embodiment, the inner cylindrical member 106 is surrounded at its upper end by an outer rotatable member 108 which forms a cap of 8620 steel, case hardened to about 58RC. The outer rotatable member 108 has at its lower end an annular groove 110. The annular groove 110 accommodates a projecting annular shoulder 112 extending from the thick collar 102 so that the outer rotatable member 108 is nested within an indentation 114 in the thick collar. The outer rotatable member 108 is axially locked with respect to the inner rotatable member 106 by a split nylon washer 116 which is received within a groove 118.

As with the first embodiment, the second embodiment includes a magnetizable element 120 made of 440C stainless steel which is received in a square recess 122 in the inner cylindrical member 106. The square recess 122 in the inner cylindrical member 106 is aligned with a square recess 124 in the outer rotatable member 108. As is seen in FIG. 9, when the wrench 128 with a reaching permanent magnet 130 is placed on the outer rotatable member 108, the magnetizable element 120 is magnetized and is drawn up into the recess 124 to couple the outer rotatable member 108 to the inner cylindrical member 106 so that applying torque to the wrench 128 causes the inner cylindrical member to rotate the nut 36 and thus open the valve 22 (FIG. 1).

In the arrangement of FIGS. 8, 9 and 10, a hardened carbon steel sleeve 130 is disposed around the inner cylindrical member 106 and is held in axial position with respect thereto by an annular shoulder 132 which has a frustoconical ramp portion 134 and an axially extending portion 136. Preferably, the sleeve 130 is 8620 steel carbonized and hardened to 58–60 RC and 0.030 case dipped. The sleeve has a shoulder 138 which abuts the ramp 134 and an axially extending surface 140 which is adjacent the axially extending surface 136 on the inner cylindrical member 106. A groove 142 cooperates with the groove 118 on the outer cylindrical member to retain the nylon split ring 116 in position so as to axially lock the outer cylindrical member with respect to the hardened steel sleeve 130 and the inner cylindrical member 106.

Positioned over the top surface of the inner cylindrical member 106 is a cobalt steel washer 150, cast to size, which steel washer or plate has a square recess 152 aligned with the square recess 122 of the inner cylindrical member 106 so that the magnetizable element 120 can slide through the cobalt steel washer into the square recess 124 in the outer rotatable member 108.

The hardened steel sleeve 130 and cobalt steel washer 150 cannot be penetrated by a drill and therefore prevent an unauthorized user from drilling a hole through the outer rotatable member 108 into the inner cylindrical member 106. Through such a hole an unauthorized user may insert a pin to lock the outer rotatable member 108 to the inner cylindrical member 106 so that a wrench applied to the outer rotatable member by the unauthorized user can rotate the inner cylindrical member and thus rotate the valve operating stem 24 of valve 22 (see FIG. 1).

It is within the scope of the present invention to equip the first embodiment 40 of the invention illustrated in FIGS. 1–7 with a cobalt steel washer, such as the washer 150, as well as to make the collar 88 of hardened steel, so as to similarly armor the valve operator security device 40 against defeat by drilling through the outer rotatable member 60 and inserting a pin to couple the outer rotatable member to the inner cylindrical member 42.

The aforedescribed arrangements provides enhanced security for fire hydrant valves which are constantly under assault by vandals and unauthorized users.

From the foregoing description, one skilled in the art can easily ascertain the essential characteristics of this invention, and without departing from the spirit and scope thereof, can make various changes and modifications of the invention to adapt it to various usages and conditions.

What is claimed:

1. A valve operator securing arrangement for fire hydrants having a valve stem, the valve stem having a valve nut, the valve stem being connected to a valve wherein rotation of the valve stem opens and closes the valve, the device comprising:

an inner cylindrical member having a lower end with a recess opening downwardly for receiving the valve nut in a non-rotational relationship, and an upper end with a first coupling element;

an outer rotational member mounted over the inner cylindrical member for rotation with respect to the inner cylindrical member, the outer rotational member including a second coupling element;

a movable magnetizable element urged to a first position, decoupling the first and second coupling elements, the magnetizable element being moveable to a second position coupling the first and second elements in a non-rotational relationship, wherein rotation of the outer rotational member rotates the inner cylindrical member to rotate the valve stem and operate the valve;

a wrench mechanically interlockable with the outer rotational member for rotating the outer rotational member, the wrench further including a reaching permanent magnet with a very strong magnetic field integral therewith and alignable with the magnetizable element for moving the magnetizable element from the first to the second position;

a fire hydrant cap for being fixed being with respect to the fire hydrant with a recess therein in which the valve nut is positioned, the recess having a circular wall surrouding the nut; and a knurled surface on the exterior of the inner cylindrical member for engaging the circular wall if an attempt is made to grip the inner cylindrical member with the outer member by applying a force to the outer rotational member tilting the outer rotational member with respect to the inner cylindrical member, so that the inner cylindrical member binds with the wall of the recess preventing the inner cylindrical member from turning with respect to the fire hydrant cap, thereby preventing the valve nut from turning.

2. The arrangement of claim 1, wherein the first coupling element is a non-round recess in the inner cylindrical member and the second coupling element is a non-round recess in the outer rotational member, the moveable magnetizable element having a cross section which complements the non-round recesses, whereby when the moveable element is drawn into the recess of the outer rotational member, the outer rotational member rotationally couples with the inner cylindrical member to rotate the valve stem nut.

3. A valve operator securing arrangement for fire hydrants having a valve stem, the valve stem having a valve nut, the valve stem being connected to a valve wherein rotation of the valve stem opens and closes the valve, the device comprising:

an inner cylindrical member having a lower end with a recess opening downwardly for receiving the valve nut in a non-rotational relationship, and an upper end with a first coupling element;

an outer rotational member mounted over the inner cylindrical member for rotation with respect to the inner cylindrical member, the outer rotational member including a second coupling element;

a movable magnetizable element urged to a first position, decoupling the first and second coupling elements, the magnetizable element being moveable to a second position coupling the first and second elements in a non-rotational relationship, wherein rotation of the outer rotational member rotates the inner cylindrical member to rotate the valve stem and operate the valve;

a wrench mechanically interlockable with the outer rotational member for rotating the outer rotational member, the wrench further including a reaching permanent magnet with a very strong magnetic field integral therewith and alignable with the magnetizable element for moving the magnetizable element from the first to the second position;

an intermediate sleeve of hardened steel positioned between the inner cylindrical member and outer rotational member; and a cobalt steel plate disposed perpendicular to the axis of the members between the inner cylindrical member and outer rotational member for preventing drilling through the outer rotational member into the inner cylindrical member in order to defeat the arrangement by linking the outer and inner members together without shifting the magnetizable element.

4. The arrangement of claim 3, wherein the first coupling element is a non-round recess in the inner cylindrical member and the second coupling element is a non-round recess in the outer rotational member, the moveable magnetizable element having a cross section which complements the non-round recesses, whereby when the moveable element is drawn into the recess of the outer rotational member, the outer rotational member rotationally couples with the inner cylindrical member to rotate the valve stem nut.

5. A valve operator securing arrangement for fire hydrants having a valve stem, the valve stem having a valve nut, the valve stem being connected to a valve wherein rotation of the valve stem opens and closes the valve, the device comprising:

an inner cylindrical member having a lower end with a recess opening downwardly for receiving the valve nut in a non-rotational relationship, and an upper end with a first coupling element;

an outer rotational member mounted over the inner cylindrical member for rotation with respect to the inner cylindrical member, the outer rotational member including a second coupling element, a portion for interlocking with a wrench and an inwardly opening circular groove;

a movable magnetizable element urged to a first position, decoupling the first and second coupling elements, the magnetizable element being moveable to a second position coupling the first and second elements in a non-rotational relationship, wherein rotation of the outer rotational member rotates the inner cylindrical member to rotate the valve stem and operate the valve;

a wrench mechanically interlockable directly with the portion of the outer rotational member for rotating the outer rotational member, the wrench further including a reaching permanent magnet with a very strong magnetic field integral therewith and alignable with the magnetizable element for moving the magnetizable element from the first to the second position;

an intermediate sleeve disposed between the inner cylindrical member and outer rotational member for rotation with respect to both members, the intermediate sleeve being restrained in axial movement by engagement with a radially extending surface on the inner cylindrical member and having an outwardly opening circular groove therein juxtaposed with the inwardly opening circular groove of the outer rotational member; and a retaining ring disposed in the grooves.

6. The arrangement of claim 5, wherein the first magnetic coupling element is a non-round recess in the inner cylindrical member and the second coupling element is a non-round recess in the outer rotational member, the moveable magnetizable element having a cross section which complements the non-round recesses, whereby when the moveable element is drawn into the recess of the outer rotational member, the outer rotational member rotationally couples with the inner cylindrical member to rotate the valve stem nut.

7. The arrangement of claim 5, wherein the retaining ring is made of a resinous material.

8. The arrangement of claim 5 further including a sleeve of resinous material disposed between the intermediate sleeve and the inner cylindrical member to minimize the opportunity for welding the members together in an attempt to defeat the arrangement.

\* \* \* \* \*